United States Patent
Anderson

(10) Patent No.: US 8,386,576 B2
(45) Date of Patent: *Feb. 26, 2013

(54) GRAPHICAL USER INTERFACE FOR MESSAGING SYSTEM

(75) Inventor: Monica Anderson, Milpitas, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,345

(22) Filed: Sep. 6, 2011

(65) Prior Publication Data

US 2012/0023420 A1    Jan. 26, 2012

Related U.S. Application Data

(63) Continuation of application No. 11/726,468, filed on Mar. 21, 2007, now Pat. No. 8,015,246.

(51) Int. Cl.
*G06F 15/16* (2006.01)
(52) U.S. Cl. .......... 709/206; 709/204; 715/758
(58) Field of Classification Search .......... 709/204–207, 709/225; 715/752, 758
See application file for complete search history.

(56) References Cited

U.S. PATENT DOCUMENTS

| | | |
|---|---|---|
| 5,706,291 A | 1/1998 | Kainulainen et al. |
| 5,867,799 A | 2/1999 | Lang et al. |
| 5,880,731 A | 3/1999 | Liles et al. |
| 5,918,014 A | 6/1999 | Robinson |
| 6,084,628 A | 7/2000 | Sawyer |
| 6,212,548 B1 | 4/2001 | DeSimone et al. |
| 6,275,811 B1 | 8/2001 | Ginn |
| 6,393,460 B1 | 5/2002 | Gruen et al. |
| 6,400,381 B1 | 6/2002 | Barrett et al. |
| 6,480,885 B1 | 11/2002 | Olivier |
| 6,484,196 B1 | 11/2002 | Maurille |
| 6,493,703 B1 | 12/2002 | Knight et al. |
| 6,515,681 B1 | 2/2003 | Knight |
| 6,571,234 B1 | 5/2003 | Knight et al. |
| 6,606,644 B1 | 8/2003 | Ford et al. |
| 6,778,982 B1 | 8/2004 | Knight et al. |
| 6,781,972 B1 | 8/2004 | Anderlind et al. |
| 6,782,448 B2 | 8/2004 | Goodman et al. |
| 6,975,833 B2 | 12/2005 | Theilmann et al. |
| 6,978,292 B1 | 12/2005 | Murakami et al. |
| 7,092,821 B2 | 8/2006 | Mizrahi et al. |
| 7,124,372 B2 | 10/2006 | Brin |
| 7,328,242 B1 | 2/2008 | McCarthy et al. |
| 7,386,799 B1 | 6/2008 | Clanton et al. |
| 7,421,476 B2 | 9/2008 | Weaver |
| 7,426,540 B1 | 9/2008 | Matsumoto et al. |
| 7,478,129 B1 | 1/2009 | Chemtob |

(Continued)

FOREIGN PATENT DOCUMENTS

WO    WO 01/067357 A2    9/2001

OTHER PUBLICATIONS

Amazon.com, *Recommended for You*, Amazon.com, Sep. 3, 2009, 2 pgs.

(Continued)

*Primary Examiner* — Jungwon Chang
(74) *Attorney, Agent, or Firm* — Morgan, Lewis & Bockius LLP

(57) ABSTRACT

A method, system and graphical user interface for a chat room system is disclosed. One aspect of certain embodiments includes sending messages that originate from a user's current chat room as well as messages that originate from nearby chat rooms to the user. Both types of messages are displayed in a single context to the user.

20 Claims, 6 Drawing Sheets

U.S. PATENT DOCUMENTS

| | | |
|---|---|---|
| 7,574,478 B2 | 8/2009 | Mittelstaedt et al. |
| 7,577,711 B2 | 8/2009 | McArdle |
| 7,661,067 B2 | 2/2010 | Chen et al. |
| 8,015,246 B1* | 9/2011 | Anderson .................... 709/204 |
| 2001/0018698 A1 | 8/2001 | Uchino et al. |
| 2001/0037242 A1 | 11/2001 | Bataillon et al. |
| 2002/0002586 A1 | 1/2002 | Rafal et al. |
| 2002/0007396 A1* | 1/2002 | Takakura et al. ............ 709/205 |
| 2002/0099775 A1 | 7/2002 | Gupta et al. |
| 2002/0099777 A1 | 7/2002 | Gupta et al. |
| 2002/0116458 A1 | 8/2002 | Bricklin et al. |
| 2003/0014489 A1 | 1/2003 | Inala et al. |
| 2003/0101227 A1 | 5/2003 | Fink |
| 2003/0105769 A1 | 6/2003 | Harris |
| 2003/0195928 A1* | 10/2003 | Kamijo et al. ................ 709/204 |
| 2003/0212746 A1 | 11/2003 | Fitzpatrick et al. |
| 2004/0019637 A1 | 1/2004 | Goodman et al. |
| 2004/0039779 A1 | 2/2004 | Amstrong et al. |
| 2004/0049539 A1 | 3/2004 | Reynolds et al. |
| 2004/0054737 A1 | 3/2004 | Daniell |
| 2004/0064512 A1 | 4/2004 | Arora et al. |
| 2004/0078444 A1 | 4/2004 | Malik |
| 2004/0111479 A1 | 6/2004 | Borden et al. |
| 2004/0128357 A1 | 7/2004 | Giles et al. |
| 2004/0172405 A1 | 9/2004 | Farran |
| 2004/0177110 A1 | 9/2004 | Rounthwaite et al. |
| 2004/0186766 A1 | 9/2004 | Fellenstein et al. |
| 2004/0193595 A1 | 9/2004 | Kaminsky et al. |
| 2004/0243580 A1 | 12/2004 | Markki et al. |
| 2004/0260770 A1* | 12/2004 | Medlin et al. ................ 709/204 |
| 2004/0267723 A1 | 12/2004 | Bharat |
| 2005/0037809 A1 | 2/2005 | Guan |
| 2005/0055409 A1 | 3/2005 | Alsarraf et al. |
| 2005/0080856 A1 | 4/2005 | Kirsch |
| 2005/0188019 A1 | 8/2005 | Mittelstaedt et al. |
| 2005/0228983 A1 | 10/2005 | Starbuck et al. |
| 2006/0074863 A1 | 4/2006 | Kishore et al. |
| 2006/0095514 A1* | 5/2006 | Wang et al. .................. 709/204 |
| 2006/0136298 A1 | 6/2006 | Klein et al. |
| 2006/0167944 A1 | 7/2006 | Baker |
| 2006/0174207 A1 | 8/2006 | Deshpande |
| 2006/0212567 A1 | 9/2006 | Gulledge et al. |
| 2006/0235932 A1* | 10/2006 | Celi et al. ..................... 709/207 |
| 2006/0242554 A1 | 10/2006 | Gerace et al. |
| 2006/0248150 A1 | 11/2006 | Chaar et al. |
| 2006/0259923 A1 | 11/2006 | Chiu |
| 2006/0282328 A1 | 12/2006 | Gerace et al. |
| 2007/0022172 A1 | 1/2007 | Anglin et al. |
| 2007/0043822 A1 | 2/2007 | Brumfield |
| 2007/0078675 A1 | 4/2007 | Kaplan |
| 2007/0150537 A1 | 6/2007 | Graham |
| 2007/0168511 A1* | 7/2007 | Brochu et al. ................ 709/225 |
| 2007/0233879 A1 | 10/2007 | Woods et al. |
| 2007/0255791 A1* | 11/2007 | Bodlaender et al. .......... 709/206 |
| 2007/0282940 A1 | 12/2007 | Sakurai |
| 2007/0294281 A1 | 12/2007 | Ward et al. |
| 2007/0299935 A1 | 12/2007 | Plastina et al. |
| 2008/0077517 A1 | 3/2008 | Sappington |
| 2008/0147501 A1 | 6/2008 | Gilliam |
| 2008/0183541 A1 | 7/2008 | Wenger et al. |
| 2008/0183815 A1 | 7/2008 | Unger |
| 2008/0189169 A1 | 8/2008 | Turpin et al. |
| 2009/0037566 A1 | 2/2009 | Hoile et al. |
| 2011/0320538 A1 | 12/2011 | Ickman et al. |
| 2012/0060103 A1* | 3/2012 | Arasaki et al. ................ 715/752 |

OTHER PUBLICATIONS

Ars Technica, *Anyone else gonna stick with Vista?*, Ars Technica, Aug. 23, 2009, 1 pg.
Blastfeed—Features, http://blastfeed.com, Mar. 17, 2007, 2 pgs.
Holwerda, *Opera 10 Released*, OSnews, Sep. 1, 2009, 2 pgs.
MetaFilter, *Recent Favorites, MetaFilter*, Jun. 14, 2006, 3 pgs.
mozillaZine, *Is There a way to limit the number RSS feed links returned?*, mozillaZne, Sep. 3, 2009, 4 pgs.
Mutton, *IRC Hacks*, O'Reilly Media, 2004, 4 pgs.
RSS definition, http://en.wikipedia.org/ . . . , Aug. 28, 2005, 1 pg.
Slashdot FAQ-Comments and Moderation, http://slashdot.org/fact . . . , Aug. 28, 2005, 20 pgs.
Slashdot, *Google Patents Its Home Page*, Slashdot, Sep. 3, 2009, 5 pgs.

* cited by examiner

FIG. 4

1st Level 402
- Arts 402a

2nd Level 404
- Ceramics 404a
- Visual Arts 404b

3rd Level 406
- Sculptures 406a
- Porcelain 406b
- Impressionism 406c
- Found Art 406d

- Health 402b
- Weight loss 404c
- Acupuncture 404d
- Herbs 404e

- Exercise 406e
- Nutrition 406f

- Sports 402c
- Contact sports 404f
- Iron Man 404g

- Football 406g
- Soccer 406h

4th Level 408
- Athletic Shoes 408a
- Nutritional Supplements 408b

GRAPHICAL USER INTERFACE FOR MESSAGING SYSTEM

RELATED APPLICATION

This application is a continuation of U.S. patent application Ser. No. 11/726,468, filed Mar. 21, 2007 now U.S. Pat. No. 8,015,246, entitled "Graphical User Interface for Chat Room with Thin Walls," which is hereby incorporated by reference in its entirety.

This application is related to U.S. patent application Ser. No. 11/726,467, filed Mar. 21, 2007, entitled "Chat Room with Thin Walls," which is hereby incorporated by reference in its entirety.

TECHNICAL FIELD

The disclosed embodiments relate generally to chat systems. More particularly, the disclosed embodiments relate to methods, systems, and user interfaces for allowing a user to receive messages from various chat rooms, and the messages are displayed in a single context to the user.

BACKGROUND

Chat system technology, commonly referred to as online chat, allows users to communicate in near-real time over a network, such as the Internet or an intranet. The most common forms of online chat are direct, one-to-one chat, commonly referred to as instant messaging (or "IM"), and chat rooms. A chat room allows multiple users to communicate synchronously within the confines of the chat room.

User interactions in chat room systems include: entering a particular chat room as an active user to type in messages and/or view messages, replying to messages in a chat room, saving messages displayed during a chat session, and switching to a different chat room.

When a user is interested in conversing with other users (participants) in a particular chat room, the user enters the room either as a registered user or as a guest. Each participant of the particular chat room sees a message window for that chat room. Participants' messages appear in the message window in the order that the messages are posted. A user can respond to a recent message by posting a reply in a response dialog box. In a chat client, the newest messages are displayed either at the top or bottom of the message window. A message window will display a pre-determined number of messages. When the maximum number of messages is reached, older messages are scrolled off the message window to make room for newer messages as they are posted. Once a message has scrolled off the message window, such a message typically cannot be redisplayed.

There are many different technologies for implementing chat systems. One common chat technology is referred to as IRC, short for "Internet Relay Chat." IRC is a client-server technology in which users must use a specific IRC client program to select and log in to chat rooms. IRC chat clients and chat server employ the TCP/IP (Internet) protocol for communications. Web-based chat technologies are also available.

In current chat systems, if a user wishes to participate in multiple chat rooms, the user must open multiple sessions to keep track of different chat rooms. Further, the current technology does not provide a convenient way for automatically determining which chat rooms/conversations are likely to be of interest to the user.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 4 is a non-limiting example of a hierarchy of chat rooms, according to certain embodiments.

DESCRIPTION OF EMBODIMENTS

Figure 1:
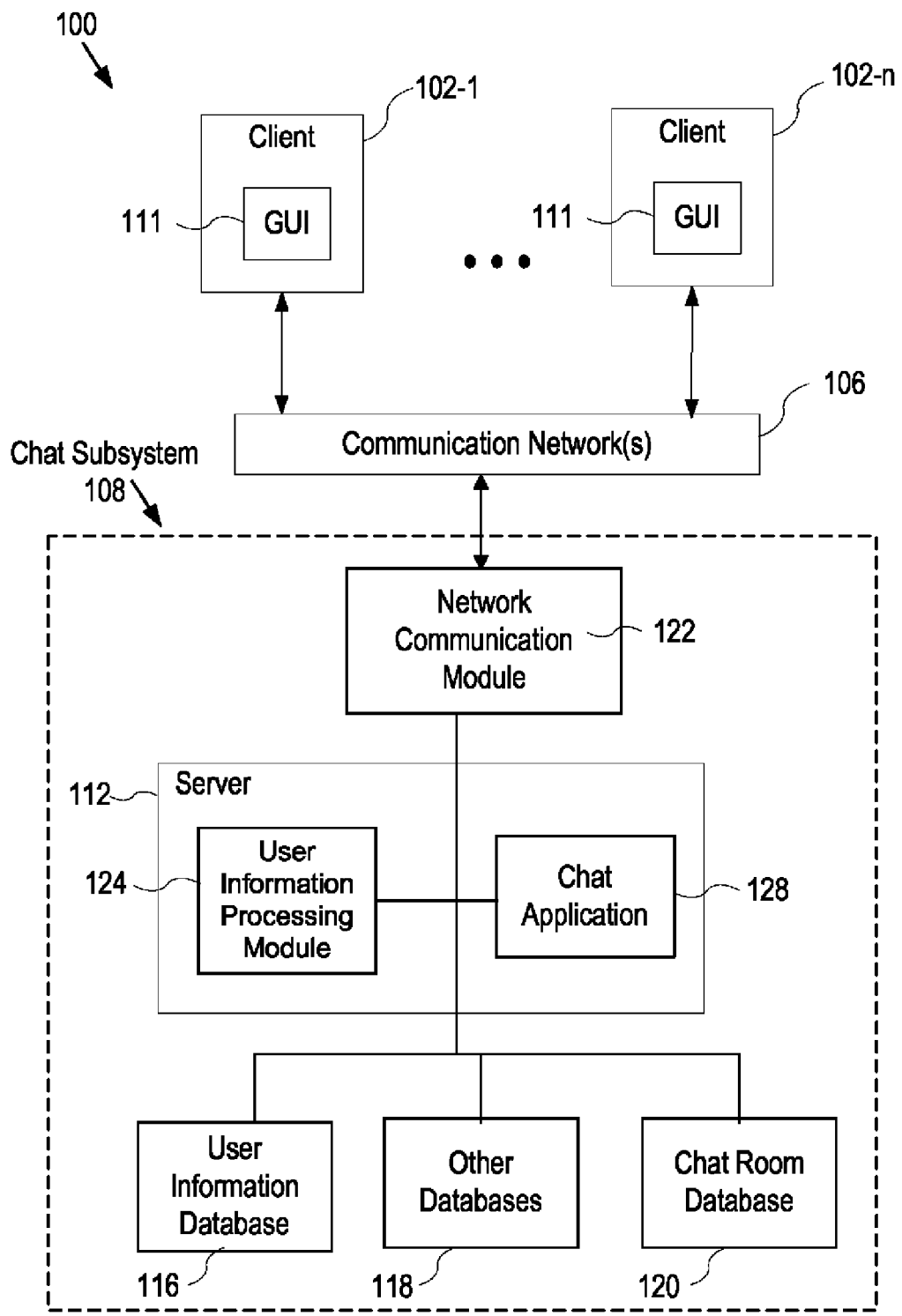
FIG. 1 is a block diagram illustrating an exemplary distributed computer system according to one embodiment of the invention.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments of the invention, a user of a chat room system receives messages that originate from the user's current chat room as well as messages that originate from one or more additional chat rooms. Messages from the current chat room and from the one or more additional chat rooms are displayed in a single context to the user. Such additional chat rooms from which messages are sent to the user are referred to herein as "nearby" chat rooms. The term "nearby" is not limited to the concept of spatial distances. For example, a particular chat room is deemed "nearby" to the current chat room if the particular chat room is popular or is a forum for topics similar to that of the current chat room. Chat rooms that qualify as "nearby" relative to the current chat room can be determined based on one or more non-limiting criteria or rules from the following non-exhaustive set: 1) the user can specify which chat rooms qualify as "nearby"; 2) chat rooms that are within a certain distance from the current chat room, if the chat rooms are organized in a hierarchy or other graph, qualify as "nearby"; 3) chat rooms in a sub-tree that satisfies a set of sub-tree criteria qualify as "nearby"; 4) chat rooms that have a topic that is similar to the topic of the current chat room qualify as "nearby"; 5) chat rooms in which occur one or more conversations that are similar to those in the current chat room qualify as "nearby"; 6) chat rooms that reach a threshold number of active users qualify as "nearby"; 7) a subset of chat rooms that collectively originate a threshold number of messages qualify as "nearby"; and 8) the user can define a set of criteria that chat rooms need to satisfy in order to qualify as "nearby."

According to certain embodiments, a graphical user interface is provided to display the messages that originate from the user's current chat room as well as messages that originate from "nearby" chat rooms in a single context. The messages that originate from the user's current chat room may be displayed based on display attributes that are different from the display attributes associated with messages that originate from "nearby" chat rooms. For example, display attributes may vary in color, typeface, font, and color intensity. According to some embodiments, messages that originate from the user's current chat room are interleaved with messages that originate from "nearby" chat rooms in chronological order when displayed to the user using the graphical interface. According to certain embodiments, the graphical user interface includes features for filtering messages that originate from the user's current chat room and from nearby chat rooms for display.

FIG. 1 is a block diagram illustrating an exemplary distributed computer system 100, according to one embodiment of the invention. In FIG. 1, system 100 may include one or more client computers 102, a communications network 106 and a chat room subsystem 108. Client computers 102 can be any of a number of computing devices (e.g., Internet kiosk, personal digital assistant, cell phone, gaming device, desktop computer, laptop computer, handheld computer, or combinations thereof) used to enable the activities described below. Client computer(s) 102 is also referred to herein as client(s). Client 102 includes a graphical user interface (GUI) 111. One embodiment of client 102 is described in greater detail herein with reference to FIG. 3. Client 102 is connected to chat room subsystem 108 via communications network 106. Chat room subsystem 108 includes one or more servers, such as server 112, connected to the communications network 106 via network communication module 122. Chat room subsystem 108 may also include user database 116, chat room database 120 and other databases 118.

Server 112 includes user processing module 124, and a chat application 128. The network communications module 122 connects server 112 to the communication network 106 and enables the receipt of communications from the communication network 106 and the provision of communications to the communication network 106 bound for client 102 or other destinations. Server 112 communicates with databases such as user database 116, chat room database 120 and other databases 118 via network communication module 122. One embodiment of server 112 is described in greater detail herein with reference to FIG. 2.

In the case of multiple servers, each server, such as server 112, is coupled to a communications network 106 via a network communication module 122. The communications network 106 may be the Internet, but may also be any local area network (LAN) and/or wide area network (WAN). In some embodiments, server 112 is a Web server that manages chat rooms and chat room messages using appropriate chat protocols. Alternatively, if server 112 is used within an intranet, it may be an intranet server.

Chat application 128 is used for organizing the chat room system hierarchy or other graph, and/or for managing the traffic of chat messages in the respective chat rooms, according to certain embodiments. The user information processing module 124 assists in accessing, updating and modifying the user information database 116. The user information database 116 stores various information about the user as described in greater detail herein. In some embodiments, the user information database 116 stores user profiles. Chat room database 120 may store global information of chat room subsystem 108 and information about each chat room in chat room subsystem 108. The other databases 118 optionally include other databases with which the various modules in server 112 may interact, such as a message database for storing messages from the various chat rooms.

In essence, server 112 is configured to manage certain aspects of chat room subsystem 108, including receiving requests from the user (associated with client 102), sending chat messages to clients 102 for display and receiving information, such as messages, user registration information and user preferences from clients 102.

In some embodiments, fewer and/or additional modules, functions or databases are included in chat room subsystem 108 and server 112. The modules shown in chat room subsystem 108 and server 112 represent functions performed in certain embodiments.

Notwithstanding the discrete blocks in FIG. 1, the figure is intended to be a functional description of some embodiments of the invention rather than a structural description of functional elements in the embodiments. One of ordinary skill in the art will recognize that an actual implementation might have the functional elements grouped or split among various components. For example, user information database 116 may be part of server 112. In some embodiments, user information database 116 may be implemented using one or more servers whose primary function is to store and process user information. Similarly, chat room database 120 may be implemented on one or more servers. Moreover, one or more of the blocks in FIG. 1 may be implemented on one or more servers designed to provide the described functionality. Although the description herein refers to certain features implemented in client 102 and certain features implemented in server 112, the embodiments of the invention are not limited to such distinctions. For example, features described herein as being part of server 112 could be implemented in whole or in part in client 102, and vice versa.

Figure 2:
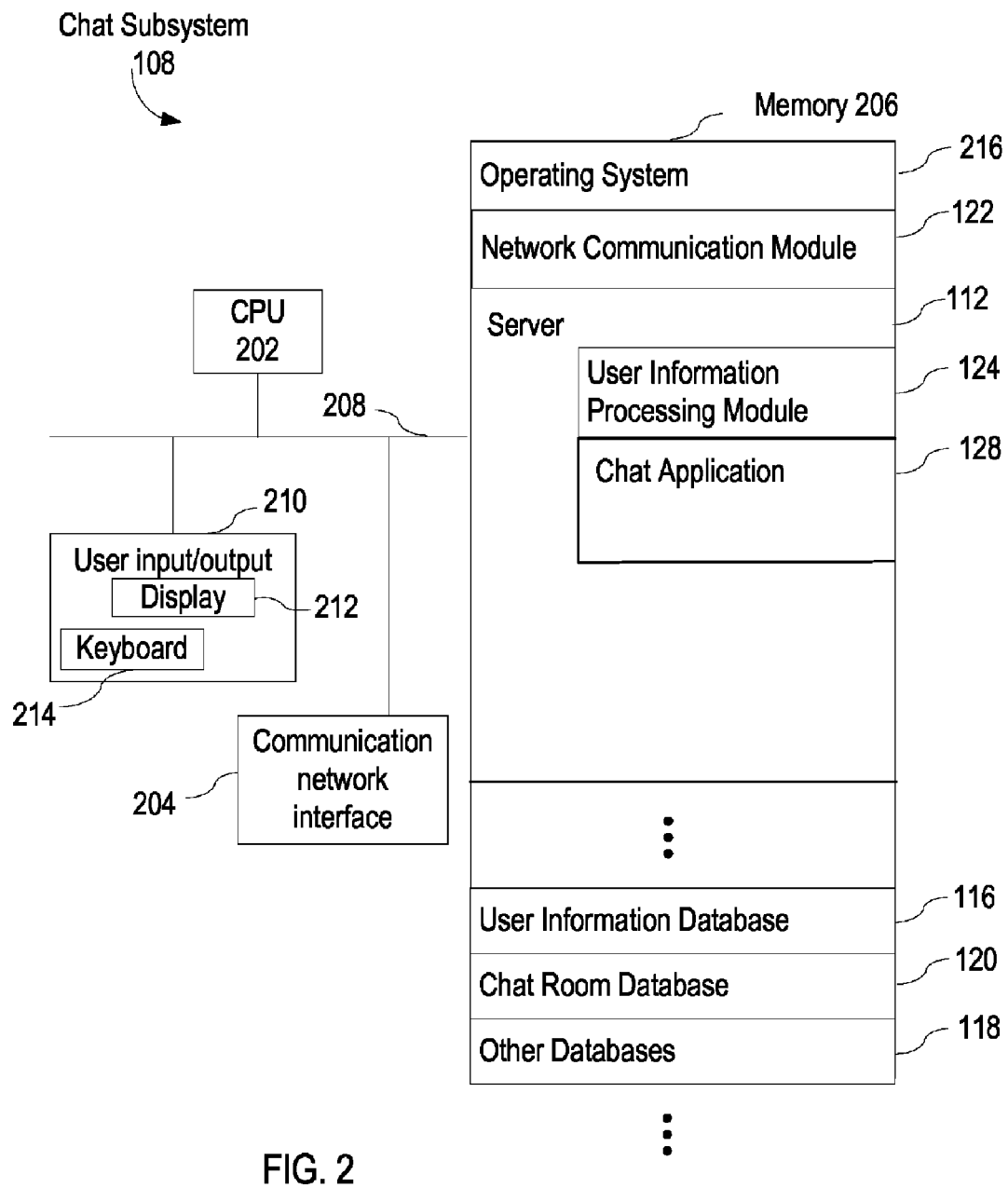
FIG. 2 is a block diagram illustrating a chat subsystem, according to certain embodiments of the invention.

FIG. 2 is a block diagram illustrating chat subsystem 108, according to certain embodiments of the invention. Chat subsystem 108 includes one or more processing units (CPU's) 202, one or more network or other communications interfaces 204, memory 206, and one or more communication buses 208 for interconnecting these components. Chat subsystem 108 optionally may include a user interface 210 comprising a display device 212 and a keyboard 214. The communication buses 208 may include circuitry (sometimes called a chipset) that interconnects and controls communications between system components.

Figure 5:
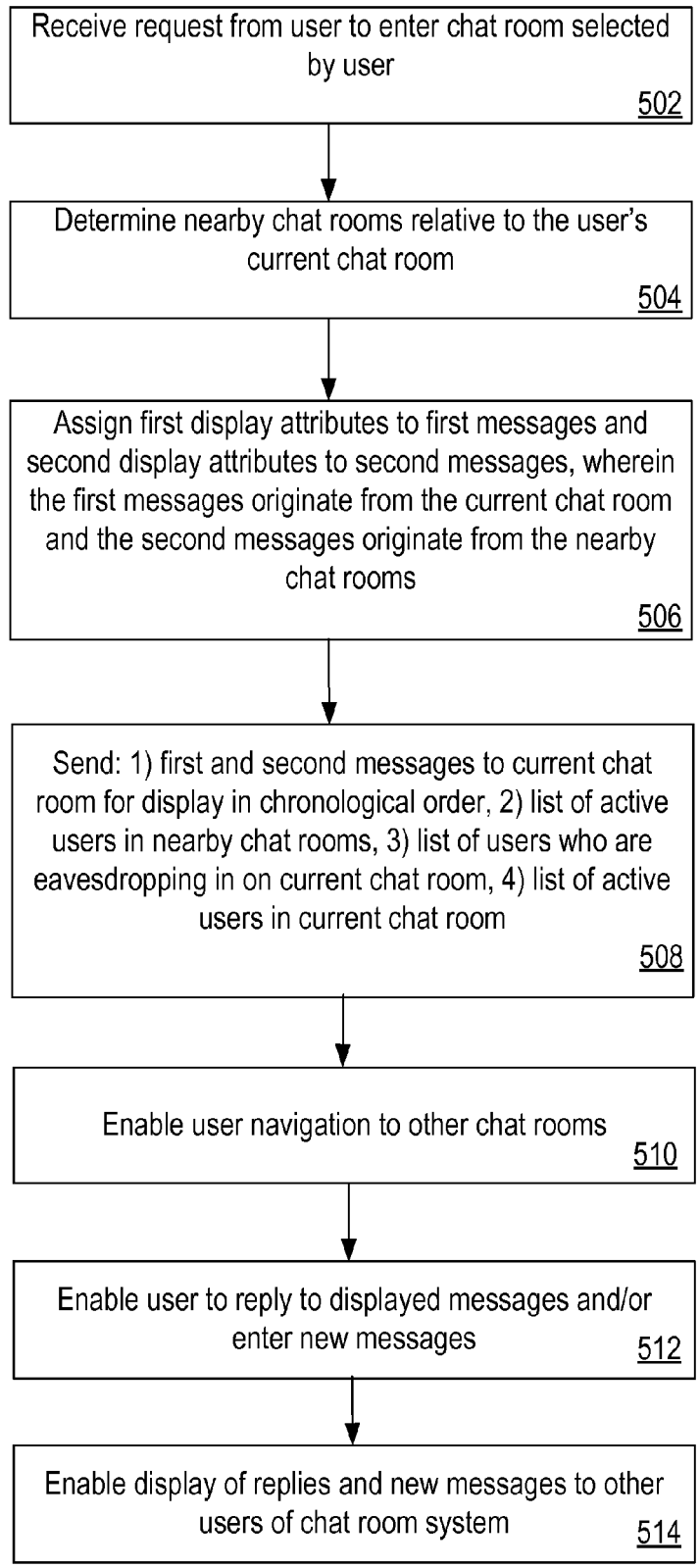
FIG. 5 is a high-level flowchart representing some of the steps for implementing a chat room system, according to certain embodiments of the invention.

Memory 206 may include high speed random access memory and may also include non-volatile memory, such as one or more magnetic or optical disk storage devices. Memory 206 may optionally include one or more storage devices remotely located from the CPU(s) 202. In some embodiments, memory 206 stores the following programs, modules and data structures, or a subset or superset thereof:
  an operating system 216 that includes procedures for handling various basic system services and for performing hardware dependent tasks;
  a network communication module (or instructions) 122 that is used for connecting chat subsystem 108 to other computers (e.g., clients 102) via one or more communication network interfaces 204 (wired or wireless) and one or more communication networks, such as the Internet, other wide area networks, local area networks, metropolitan area networks, and so on;

a server 112 for managing certain aspects of chat subsystem 108;

a user information database 116 for storing information about users as described herein with reference to FIG. 5;

a chat room database 120 for storing information about the chat rooms in chat subsystem 108; and other databases 118 that the various modules in server 112 may interact with, such as a message database.

In some embodiments, server 112 includes the following non-limiting examples of elements, or a subset of such elements: a user information processing module 124, and a chat application program 128. The functions of chat application program 128 are described in greater detail herein with reference to FIG. 5. User information processing module 124 may be used for accessing and modifying user information database 116. In some embodiments, server 112 and/or the databases 116, 118 and 120 include additional modules.

Figure 3:
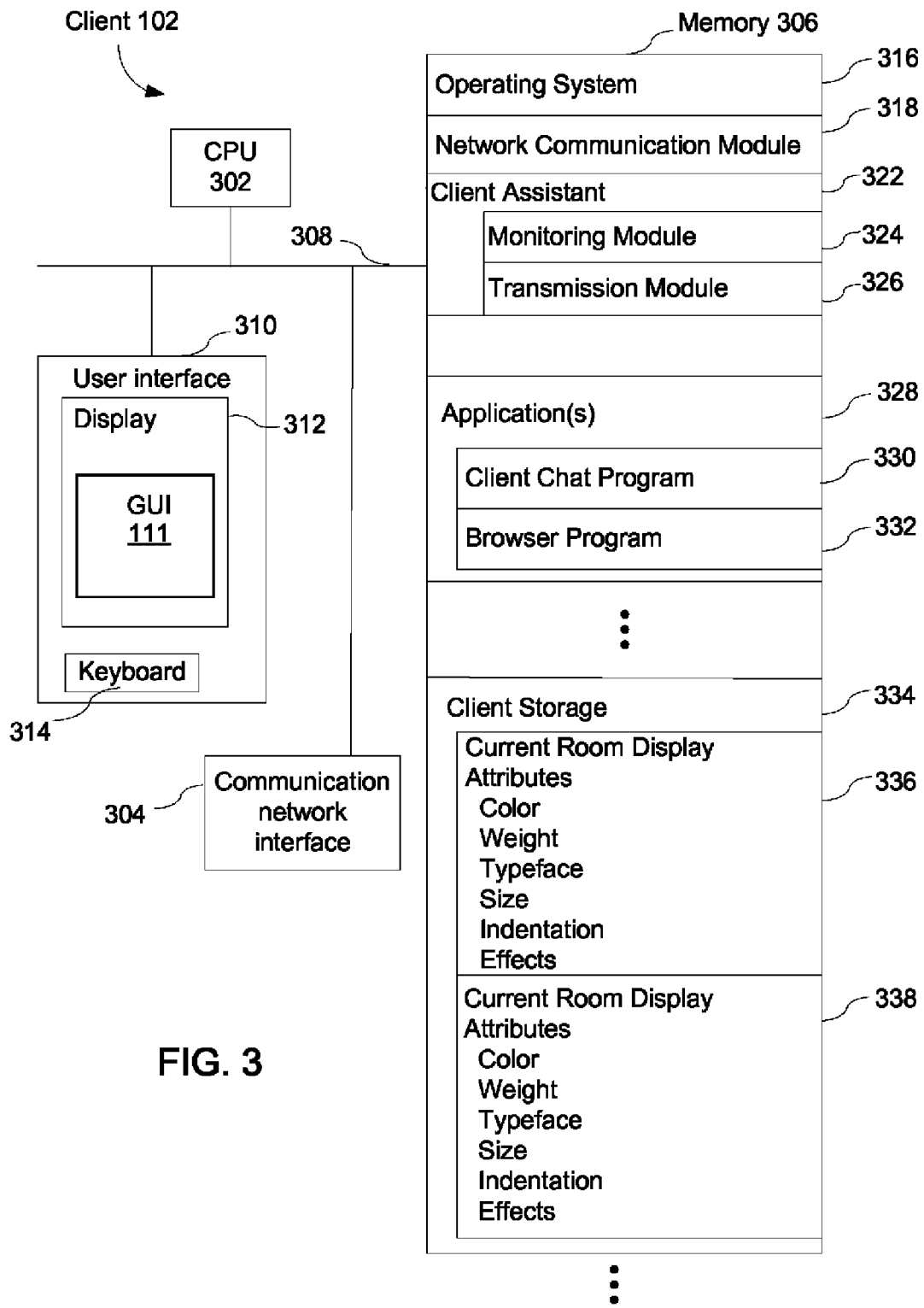
FIG. 3 is a block diagram illustrating a client, according to certain embodiments of the invention.

FIG. 3 is a block diagram illustrating client 102, according to certain embodiments of the invention. Client 102 includes one or more processing units (CPUs) 302, one or more network or other communications interfaces 304, memory 306, and one or more communication buses 308 for interconnecting these components. The communication buses 308 may include circuitry (sometimes called a chipset) that interconnects and controls communications between system components. Client 102 may include a user interface 310, for instance a display 312 with GUI 111 and a keyboard 314. Memory 306 may include high speed random access memory and may also include non-volatile memory, such as one or more magnetic or optical storage disks. Memory 306 may include mass storage that is remotely located from CPUs 302. Memory 306 may store the following elements, or a subset or superset of such elements:

an operating system 316 that includes procedures for handling various basic system services and for performing hardware dependent tasks;

a network communication module (or instructions) 318 that is used for connecting the client 102 to other computers via the one or more communications network interfaces 304 (wired or wireless) and one or more communication networks, such as the Internet, other wide area networks, local area networks, metropolitan area networks, and so on;

a client assistant 322 (e.g., a toolbar, iframe (inline frame), or browser plug-in), which includes a monitoring module 324 for monitoring the activities of a user, and a transmission module 326 for transmitting information about the user's activities to and receiving information from the chat room subsystem 108;

client applications 328 such as a client chat application program 330 and a browser application program 332. The function of client chat application 330 is described in greater detail herein with reference to FIG. 5 and FIG. 6; and client storage 334 for storing data, including current chat room message display attributes 336 and nearby chat room display attributes 338. Current chat room message display attributes 336 and nearby chat room display attributes 338 are described in greater detail herein with reference to FIG. 5 and FIG. 6.

The above identified modules and applications in FIG. 2 and FIG. 3 correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memories 206 and 306 may store a subset of the modules and data structures identified above. Furthermore, memories 206 and 306 may store additional modules and data structures not described above.

Although FIG. 2 and FIG. 3 show chat room subsystem 108 and client 102 as a number of discrete items, FIG. 2 and FIG. 3 are intended more as a functional description of the various features which may be present in chat room subsystem 108 and client 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in chat room subsystem 108 and how features are allocated among them may vary from implementation to implementation, and may depend in part on the amount of data traffic that the system handles during peak usage periods as well as during average usage periods.

In one non-limiting example, the chat rooms in the chat room system are organized in a hierarchy or other graph based on the topic of discussion in a respective chat room. For example, server 112 may use an application program such as chat application program 128 to organize the chat rooms. For purposes of explanation, assume a set of chat rooms is organized in a hierarchy as shown in FIG. 4. FIG. 4 is a non-limiting example of a hierarchy of chat rooms, according to certain embodiments. The hierarchy shown in FIG. 4 is merely illustrative and is meant to help explain certain aspects of some of the embodiments. The chat rooms need not be organized in a hierarchy or in any particular manner. FIG. 4 shows a first level of nodes 402, a second level of nodes 404, a third level of nodes 406, and a fourth level of nodes 408 in the hierarchy. The number of levels of nodes, the number of nodes in each level, and the category at a given node may vary from implementation to implementation. For purposes of illustration, the first level nodes include the categories Arts 402a, Health 402b, and Sports 402c, which represent chat rooms in the stated categories. The second level nodes 404 represent a more granular set of categories such as sub-categories 404a-404g. Likewise, the third level nodes 406 and the fourth level nodes 408 represent sub-categories of increasing granularity, such as sub-categories 406a-406h and 408a-408b, respectively. Each category or sub-category at a given level may or may not be sub-divided into further sub-categories. For example, second level sub-categories Ceramics 404a, Visual Arts 404b, Weight Loss 404c and Contact Sports 404f are further sub-divided, whereas sub-categories Acupuncture 404d, Herbs 404e and Iron Man 404g are not further sub-divided.

More generally, the chat rooms can be arranged in any sort of graph structure where some kind of similarity between chat room topics (or other aspects of the chat rooms, such as the identity of participants) is expressed as a link in the graph between nodes representing the rooms. In one implementation of a complex graph, the chat rooms might be organized in a topic-based hierarchy with the addition of arbitrary cross-links between chat rooms that reflect some similarity between chat rooms that is not expressed by the hierarchy. For example, referring to FIG. 4, a chat room dedicated to discussions about "Ballet" might be categorized under the first level "Arts" category 402a and also have a cross link under the first level "Sports" category 402c (reflecting a view of Ballet as both an Art and a Sport). Systems that organize arbitrary information into hierarchies are likely to result in organizational schemes that are incomplete and/or counter-intuitive and as a result produce complex system graphs. As a result, by accommodating hierarchies/graphs of chat rooms with arbitrary linkages, some embodiments of the present invention are operable with chat room systems that are organized in any manner.

FIG. 5 is a high-level flowchart representing some of the steps for implementing a chat room system, according to certain embodiments of the invention. FIG. 5 shows some of the processes performed by server 112. It will be appreciated by those of ordinary skill in the art that one or more of the acts described may be performed by hardware, software, or a combination thereof, as may be embodied in one or more computing systems. FIG. 5 is described with reference to FIGS. 2 and 3. FIG. 5 is also described with reference to FIG. 4 for purposes of explaining, among other aspects, one concept of "nearness" and "nearby rooms". For purposes of explanation, assume that the chat rooms are organized in the hierarchy that is illustrated in FIG. 4. However, as described above, the chat rooms need not be organized in any particular manner. Further assume that a user selects a chat room from the hierarchy of FIG. 4 and enters the chat room. The chat room that the user is currently in is referred to herein as the "current chat room".

Server 112 receives (502) a request from a user via client 102 to enter the chat room selected by the user. In addition to sending the request to enter the selected chat room, the user may send registration information, such as a username and password, to server 112, via communications network 122. Server 112 associates data received from client 102 with a particular user record in user information database 116. For example, user information processing module 124 may be used to verify login information and associate chat messages entered by the user with the user's data record in user information database 116. In some embodiments, the user may be identified using a cookie stored on the client 102, or by a user identifier that is stored by and associated with a browser toolbar or browser extension. According to some embodiments, server 112 uses chat room application 128 to communicate with databases 116, 118 and 120.

Server 112 (504) uses chat room application 128 to determine which chat rooms in the hierarchy/graph are "nearby" relative to the selected current chat room. The messages received by the user in the current chat room include messages that are posted contemporaneously in the nearby chat rooms. The manner in which such messages are received by the user is described in greater detail herein with reference to blocks 506 and 508. Nearby chat rooms may be determined by implementing one or more of the following non-limiting examples:

- User-selected chat rooms: The user can specify which chat rooms in the hierarchy qualify as "nearby." For example, the chat application program 128 may give the user an option to designate one or more chat rooms in the hierarchy as "nearby" rooms, relative to the current chat room.
- Distance function: Chat rooms that are within a certain distance from the current chat room in the hierarchy or other graph qualify as "nearby", where the distance is based on a defined distance function. To illustrate, chat rooms that are within a given number of nodes from the current chat room node, in any direction, qualify as "nearby." The defined distance function may be defined by the chat system or by the user. If the user has the option of defining the distance function, the chat system default definition is used in the event that the user declines to provide a distance function. Alternatively, if the user declines to provide a distance function, some other system default criteria or other user-defined criteria may be used to determine "nearness." In some embodiments, the distance function is based on the graph distance between the current chat room and other chat rooms, where "graph distance" is defined—even for the most complex graphs—as the minimum number of links in a graph that are traversed when moving from one node (e.g., chat room) in the graph to another node/chat room in the graph.
- Sub-tree: For chat rooms that are organized in a hierarchy, the chat rooms in a sub-tree qualify as "nearby," if the sub-tree satisfies a set of sub-tree criteria. The sub-tree criteria may be defined by the chat system or by the user. If the user has the option of defining the sub-tree criteria, the chat system default definition is used in the event that the user declines to define the sub-tree criteria. Alternatively, if the user declines to define a sub-tree criteria, some other system default criteria or other user-defined criteria may be used to determine "nearness."
- Topic similarity: Chat rooms that have a topic that is similar to the topic of the current chat room qualify as "nearby." For example, a categorization tool may be used to find chat rooms that have a topic that is similar to the topic of the current chat room. In some embodiments, topic similarity can be determined using thesaurus lookup on words in room titles or descriptions.
- Conversation similarity: Chat rooms in which occur one or more conversations that are similar to those in the current chat room qualify as "nearby." For example, a categorization tool may be used to determine which conversations are similar. In some embodiments, conversation similarity can be determined using thesaurus lookup on conversation titles or descriptions.
- Number of active users: Chat rooms that reach a threshold number of active users qualify as "nearby." The threshold number may be defined by the chat system or by the user. If the user has the option of defining the threshold number, the chat system default definition is used in the event that the user declines to provide a threshold number. As another example, a subset of chat rooms that collectively originate a threshold number of active users qualify as "nearby." The subset of chat rooms may comprise chat rooms at surrounding nodes relative to the node of the current chat room. The subset of chat rooms only includes as many rooms as are necessary to meet the threshold number of active users, collectively. Thus, the subset of chat rooms may shrink or expand depending on the collective number of active users at a given time. Alternatively, if the user declines to provide a threshold number, some other default criteria or other user-defined criteria may be used to determine "nearness."
- Number of messages: A subset of chat rooms that collectively originate a threshold number of messages qualify as "nearby." The subset of chat rooms may comprise chat rooms at surrounding nodes relative to the node of the current chat room. The subset of chat rooms only includes as many rooms as are necessary to meet the threshold number of messages, collectively. Thus, the subset of chat rooms may shrink or expand depending on the number of messages that are generated at a given time. The threshold number may be defined by the chat system or by the user. If the user has the option of defining the threshold number, the chat system default definition is used in the event that the user declines to provide a threshold number. Alternatively, if the user declines to provide a threshold number, some other default criteria or other user-defined criteria may be used to determine "nearness."

User-defined criteria: The user can define a set of criteria that chat rooms in the hierarchy need to satisfy in order to qualify as "nearby." As a non-limiting example, the user-defined criteria may be a function of one or more aspects of the chat room system. To illustrate, the user may specify that chat rooms with topics related to sports qualify as being "nearby." As another illustration, the user may specify that chat rooms with topics that contain the word "art" qualify as "nearby." As yet another example, chat rooms that are determined as popular by users or by the number of messages may qualify as "nearby."

To illustrate the concept of "nearby" chat rooms, assume that the user's current chat room is at node, Weight loss 404c, of FIG. 4. Further assume that topic similarity is one of the criteria for determining "nearby" chat rooms. In such a case, the nearby rooms may include the respective chat rooms at the following nodes as illustrated in FIG. 4:

Second level node Acupuncture 404d
Second level node Herbs 404e
Third level node Exercise 406e
Third level node Nutrition 406f
Fourth level node Nutritional Supplements 408b Returning to FIG. 5, at block 506, server 112 assigns display attributes to messages that originate in the current chat room and assigns respective display attributes to messages that originate in the nearby chat rooms. For example, server 112 may use chat application program 128 to retrieve and assign the current chat room display attributes 336 and nearby chat room display attributes 338. Such display attributes may be pre-defined and stored in client storage 334 at the client 102. Since messages originating in the current chat room and those originating in the nearby chat rooms are to be displayed in a single context to the user in the current chat room, the display attributes enable the messages that originate in the current chat room to be distinguished from messages that originate in the nearby chat rooms. To illustrate, the messages that originate in the current chat room may be displayed in a pre-selected color and/or font while the messages that originate in the various nearby rooms are displayed in other colors and/or fonts. Non-limiting examples of display attributes include color, color intensity, typeface, indentation, size and fonts for respective typefaces.

At block 508, server 112, with the help of chat application program 128 for example, sends the messages that originate from the current chat room and the associated nearby chat rooms to the user. According to certain embodiments, such messages are displayed in the current chat room in chronological order and in accordance with the respective display attributes. Client chat application program 330 may be used to display the messages. Server 112 may optionally send additional information to the user such as a list of active users in the nearby chat rooms, a list of users who are eavesdropping in the current chat room, and a list of active users in the current chat room.

At block 510, the user may switch or navigate to a different chat room by entering one of the "nearby" chat rooms or any chat room in the hierarchy/graph. In some embodiments the client chat program 330 enables the user to navigate to another chat room (the "destination" room) in a variety of ways, including but not limited to: selecting the destination room from a list of nearby rooms specified by the chat application program 128; double-clicking (or using some other predetermined selection method) on a displayed message that originates from the desired destination room; and using navigation buttons provided by the user interface of the client chat program 330, including "back" (enables navigation to the previous room in an ordered list of historic current rooms for the user), "forward" (enables navigation to the next room in an ordered list of historic current rooms for the user), and "next" (enables navigation to a close nearby room in the hierarchy/graph that was not necessarily a prior "current chat room" for the user). Other possible ways in which the user can navigate to a different chat room include: selecting the destination room from a listing or an illustration of the hierarchy/graph of chat rooms provided by the chat application program 128; and entering the name of the desired destination room in a text entry window.

At block 512 the user is allowed to reply to messages that are presented to them by the client chat program 330 or to enter new messages that are not associated with any existing conversation. A user can reply to or enter messages in a variety of ways. In some embodiments, to reply to a message that originated in the user's current chat room, or to enter a new message in that room, the user needs only to type a message in a message entry window provided by the client chat program 330. This message is subsequently displayed to other users of the chat system consistent with the other users' respective sets of current and nearby chat rooms (514). Alternatively, a user can click on (or otherwise select) a message that originated from the user's current chat room and type a reply in a message entry window. The resulting message when displayed for other users within the chat system can be associated with the same conversation as the original message due to its selection by the user.

In some embodiments, to reply to a displayed message that originated in another chat room the user can navigate to the originating room, enter a reply in that room, and then, if desired, navigate back to the former "current" room (for example, by using a "back" button provided by the client chat program 330 for that purpose). In some embodiments, a user can also reply to a displayed message from another chat room without leaving his/her current chat room. This can be implemented by the chat system automatically associating any user reply to a specific message with the chat room from which that message originated.

For example, in an exemplary embodiment a user has the following options to respond to and/or interact with messages displayed by the client chat program 330: They can single-click (or use another selection method) on a message to type a reply to it without moving anywhere (even if the message originated from a different chat room) and they can double-click (or use another selection method) on a message to move to the room where the message originated—with the possible option of providing a back button to return to the original room. If no message is selected, then the message is simply posted to the current room.

Figure 6:
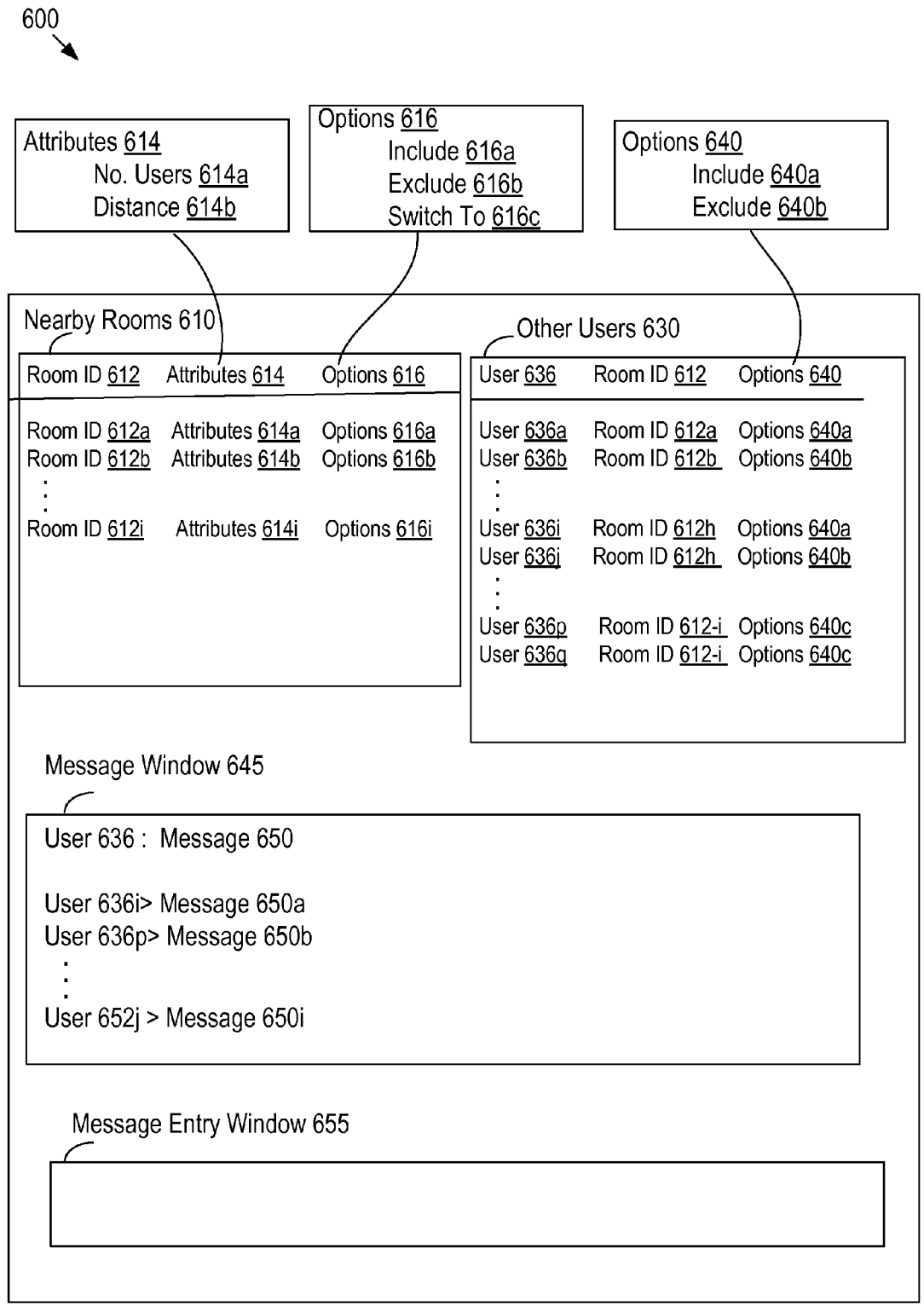
FIG. 6 is a schematic of a chat room GUI for displaying messages to the user in the current chat room, according to certain embodiments of the invention.

FIG. 6 is a schematic of a chat room GUI 600 for displaying messages to the user in the current chat room, according to certain embodiments of the invention. Client chat application program 330 manages GUI 600, according to certain embodiments. GUI 600 includes a display of information on nearby chat rooms 610, a display of information on other users 630, a message window 645, and a message entry window 655. The embodiments are not limited to the features shown in FIG. 6, and thus may vary from implementation to implementation.

As a non-limiting example, the display of information on nearby rooms 610 includes information such as room identification (ID) 612, room attributes 614, and room options 616. The display shows room IDs 612*a-i*, respective room attributes 614*a-i*, and respective room options 616*a-i*. Examples of room attributes 614 are number of users 614*a* in the room, and the distance 614*b* from the current chat room. Examples of room options 616 are: 1) an "include" option 616*a* for allowing the user to specify rooms for inclusion as "nearby" chat rooms, 2) an "exclude" option 616*b* for allowing the user to specify rooms for exclusion from the set of "nearby" chat rooms, and 3) a "switch to" option 616*c* for allowing the user to switch to a new current chat room.

The display of information on other users 630 includes information on users who are participating either in the current chat room or in the "nearby" chat rooms or users who are merely eavesdropping on the current chat room. Examples of information on other users include user id 636, room id 612 and options 640. Thus, the display of information on other users 630 shows: 1) a list of ids, such as user ids 636*a, b, . . . p, q*, of users who are participating in the current chat rooms, who are in the "nearby" chat rooms, and/or who are eavesdropping, 2) the room id (room id 612*a, b, . . . h, i*) of the respective users listed in user id 636, and 3) options 640*a,b* etc., that are associated with the respective users listed in user id 636. Examples of options 640 are: 1) an "include" option 640*a* for allowing the user to include, for viewing, messages of other users in "nearby" chat rooms as specified by the user, and 2) an "exclude" option 640*b* 640*a* for allowing the user to exclude, from viewing, messages of other users in "nearby" chat rooms as specified by the user.

The message window 645 displays messages 650 from various users 636 who are participating either in the current chat room or in the nearby chat rooms. To illustrate, message window 645 displays message 650*a* from a user with user id 636*j*. Similarly, messages 650*b* and 650*i* are from users with user id 636*p* and 652*j*, respectively. Such messages are displayed, in the current chat room, in chronological order and in accordance with the respective assigned display attributes. For purposes of explanation, assume that message 650*b* originates from the current chat room, and that message 650*a* is from one of the nearby chat rooms, and message 650*i* is from yet another nearby chat room. To illustrate, message 650*a* may be distinguished from messages 650*b*, 650*i* by displaying messages 650*a*, 650*b*, 650*j* using mutually different display characteristics, such as using different display colors, and/or different fonts. Message entry window 655 allows the user in the current chat room to enter a message in the current chat room or reply to a message that is displayed in the current chat room.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer system, comprising:
one or more processors; and
memory storing one or more programs for execution by at least one of the one or more processors, the one or more programs including instructions for providing first and second messages for display in a message window,
wherein the first messages and second messages are displayed simultaneously within the message window,
wherein the first messages originate from a first set of conversation messages and the second messages originate from at least a second set of conversation messages,
wherein at least the second set of conversation messages is selected without user involvement and is based on a similarity criterion between at least the second set of conversation messages and the first set of conversation messages, and
wherein the user is a participant in the first set of conversation messages and not a participant in at least the second set of conversation messages.

2. The system of claim 1, wherein a plurality of conversation messages including the first set of conversation messages and the second set of conversation messages is in a hierarchy based on topics of respective sets of conversation messages, and the second set of conversation messages is selected based on a graph distance between a first node corresponding to a topic of the first set of conversation messages and a second node corresponding to a topic of the second set of conversation messages.

3. The system of claim 2, wherein the first messages are displayed using first display attributes, the second messages are displayed using second display attributes distinct from the first display attributes, and the second display attributes are selected based on the graph distance between the first node corresponding to the topic of the first set of conversation messages and the second node corresponding to the topic of the second set of conversation messages.

4. The system of claim 1, wherein the second set of conversation messages is selected based on a number of messages in the second set of conversation messages such that the first set of conversation messages and the second set of conversation messages collectively include at least a predetermined number of messages.

5. The system of claim 1, wherein the second set of conversation messages is selected based on a number of participants in the second set of conversation messages such that the first set of conversation messages and the second set of conversation messages collectively include at least a predetermined number of participants.

6. The system of claim 1, wherein the first messages are interleaved with the second messages in chronological order.

7. The system of claim 1, wherein the first messages originate from a first chat room and the second messages originate from at least a second chat room distinct from the first chat room.

8. A method, performed by a computer system that includes one or more processors and memory storing one or more programs for execution by the one or more processors, the method comprising:
at the computer system:
providing first and second messages for display in a message window,
wherein the first messages and second messages are displayed simultaneously within the message window,
wherein the first messages originate from a first set of conversation messages and the second messages originate from at least a second set of conversation messages,
wherein at least the second set of conversation messages is selected without user involvement and is based on a similarity criterion between at least the second set of conversation messages and the first set of conversation messages, and wherein the user is a participant in the first set of conversation messages and not a participant in at least the second set of conversation messages.

9. The method of claim 8, wherein a plurality of conversation messages including the first set of conversation messages and the second set of conversation messages is in a hierarchy based on topics of respective sets of conversation messages, and the second set of conversation messages is selected based on a graph distance between a first node corresponding to a topic of the first set of conversation messages and a second node corresponding to a topic of the second set of conversation messages.

10. The method of claim 9, wherein the first messages are displayed using first display attributes, the second messages are displayed using second display attributes distinct from the first display attributes, and the second display attributes are selected based on the graph distance between the first node corresponding to the topic of the first set of conversation messages and the second node corresponding to the topic of the second set of conversation messages.

11. The method of claim 8, wherein the second set of conversation messages is selected based on a number of messages in the second set of conversation messages such that the first set of conversation messages and the second set of conversation messages collectively include at least a predetermined number of messages.

12. The method of claim 8, wherein the second set of conversation messages is selected based on a number of participants in the second set of conversation messages such that the first set of conversation messages and the second set of conversation messages collectively include at least a predetermined number of participants.

13. The method of claim 8, wherein the first messages are interleaved with the second messages in chronological order.

14. The method of claim 8, wherein the first messages originate from a first chat room and the second messages originate from at least a second chat room distinct from the first chat room.

15. A non-transitory computer readable storage medium storing one or more programs for execution by one or more processors of a computer system, the one or more programs including instructions for:

providing first and second messages for display in a message window, wherein the first messages and second messages are displayed simultaneously within the message window, wherein the first messages originate from a first set of conversation messages and the second messages originate from at least a second set of conversation messages, wherein at least the second set of conversation messages is selected without user involvement and is based on a similarity criterion between at least the second set of conversation messages and the first set of conversation messages, and wherein the user is a participant in the first set of conversation messages and not a participant in at least the second set of conversation messages.

16. The computer readable storage medium of claim 15, wherein a plurality of conversation messages including the first set of conversation messages and the second set of conversation messages is in a hierarchy based on topics of respective sets of conversation messages, and the second set of conversation messages is selected based on a graph distance between a first node corresponding to a topic of the first set of conversation messages and a second node corresponding to a topic of the second set of conversation messages.

17. The computer readable storage medium of claim 16, wherein the first messages are displayed using first display attributes, the second messages are displayed using second display attributes distinct from the first display attributes, and the second display attributes are selected based on the graph distance between the first node corresponding to the topic of the first set of conversation messages and the second node corresponding to the topic of the second set of conversation messages.

18. The computer readable storage medium of claim 15, wherein the second set of conversation messages is selected based on a number of messages in the second set of conversation messages such that the first set of conversation messages and the second set of conversation messages collectively include at least a predetermined number of messages.

19. The computer readable storage medium of claim 15, wherein the second set of conversation messages is selected based on a number of participants in the second set of conversation messages such that the first set of conversation messages and the second set of conversation messages collectively include at least a predetermined number of participants.

20. The computer readable storage medium of claim 15, wherein the first messages are interleaved with the second messages in chronological order.

* * * * *